United States Patent
Mearns

(10) Patent No.: US 8,700,936 B2
(45) Date of Patent: Apr. 15, 2014

(54) MODULAR GATING OF MICROPROCESSOR LOW-POWER MODE

(75) Inventor: Brian Patrick Mearns, Somerville, MA (US)

(73) Assignee: Schneider Electric IT Corporation, West Kingston, RI (US)

( * ) Notice: Subject to any disclaimer, the term of this patent is extended or adjusted under 35 U.S.C. 154(b) by 553 days.

(21) Appl. No.: 12/959,784

(22) Filed: Dec. 3, 2010

(65) Prior Publication Data

US 2012/0144220 A1    Jun. 7, 2012

(51) Int. Cl.
*G06F 1/32* (2006.01)

(52) U.S. Cl.
USPC ........... 713/323; 713/300; 713/320; 713/321; 713/322; 713/324

(58) Field of Classification Search
None
See application file for complete search history.

(56) References Cited

U.S. PATENT DOCUMENTS

| | | | |
|---|---|---|---|
| 6,282,662 B1 * | 8/2001 | Zeller et al. | 713/300 |
| 7,315,952 B2 * | 1/2008 | Wilcox et al. | 713/320 |
| 8,024,591 B2 * | 9/2011 | Bertelsen et al. | 713/323 |
| 2002/0083353 A1 | 6/2002 | Orenstein et al. | |
| 2006/0294520 A1 | 12/2006 | Anderson | |
| 2008/0104438 A1 | 5/2008 | Yokoyama et al. | |
| 2008/0307244 A1 * | 12/2008 | Bertelsen et al. | 713/323 |
| 2010/0281277 A1 * | 11/2010 | Qin et al. | 713/300 |
| 2012/0144220 A1 * | 6/2012 | Mearns | 713/323 |

FOREIGN PATENT DOCUMENTS

| | | |
|---|---|---|
| WO | 9827481 A1 | 6/1998 |
| WO | 2006071945 A2 | 7/2006 |

OTHER PUBLICATIONS

International Search Report and Written Opinion from corresponding International Application No. PCT/US2011/062983 mailed Mar. 22, 2012.

* cited by examiner

*Primary Examiner* — Tanh Nguyen
(74) *Attorney, Agent, or Firm* — Lando & Anastasi, LLP

(57) ABSTRACT

A method of operating an electronic device includes determining whether one or more operating conditions for allowing the electronic device to operate in a low-power mode are satisfied, preventing the electronic device from operating in the low-power mode if fewer than all of the operating conditions are satisfied, and causing the electronic device to operate in the low-power mode if all of the operating conditions are satisfied.

13 Claims, 4 Drawing Sheets

MODULAR GATING OF MICROPROCESSOR LOW-POWER MODE

BACKGROUND OF THE INVENTION

1. Field of the Invention

Embodiments of the present invention relate generally to power management in electronic devices, and more particularly, to controlling power consumption in electronic devices that are configured to operate in a low-power mode.

2. Discussion of Related Art

Many electronic devices, and in particular, microprocessors and microcontrollers, are used in applications having an independent power supply, such as a battery. To extend battery life, and more generally, to conserve energy, many devices provide one or more low-power operating modes in which the device consumes less power. For example, in one low-power mode, the microprocessor temporarily suspends instruction execution (i.e., by entering an "idle" state) based on processing demand, which reduces power consumption when processing capacity exceeds processing demand. Many devices that make use of these low-power modes operate on the basis of a "sleep cycle" in which the device regularly enters the low-power mode for some amount of time, and then "wakes" from the low-power mode to perform certain functions of the device. This power consumption technique can cause unsolicited processing interruptions, resulting in inefficient operation.

BRIEF SUMMARY OF THE INVENTION

According to one embodiment of the present disclosure, a method of operating an electronic device includes determining whether one or more operating conditions for allowing the electronic device to operate in a low-power mode are satisfied, preventing the electronic device from operating in the low-power mode if fewer than all of the operating conditions are satisfied, and causing the electronic device to operate in the low-power mode if all of the operating conditions are satisfied. The method may further include suspending execution of at least one process of the electronic device if at least one of the operating conditions is satisfied. The method may further include resuming execution of the process subsequent to causing the electronic device to operate in the low-power mode. Resuming execution of the process may include a cold start, a warm start, or a hot start. The method may further include resuming execution of the process subsequent to preventing the electronic device from operating in the low-power mode.

According to another embodiment, the method may further include initializing one or more flags to a first value, detecting that the operating condition is satisfied, and setting one of the one or more flags to a second value that is different than the first value subsequent to detecting that a respective one of the operating conditions is satisfied. Preventing the electronic device from operating in the low-power mode may further include preventing the electronic device from operating in the low-power mode if any of the flags contains the first value. The method may further include setting all of the flags to the first value subsequent to causing the electronic device to operate in the low-power mode. The method may further include setting all of the flags to the first value subsequent to preventing the electronic device from operating in the low-power mode.

According to another embodiment, the method may further include removing power from at least one peripheral device that is coupled to the electronic device if at least one of the one or more operating conditions is satisfied, restoring power to the peripheral device subsequent to causing the electronic device to operate in the low-power mode, and restoring power to the peripheral device subsequent to preventing the electronic device from operating in the low-power mode. The method may further include causing the electronic device to operate in the low power mode for a predetermined amount of time. If a sleep cycle interval time is greater than or equal to an amount of time that has elapsed since the electronic device last completed operating in the low-power mode, the predetermined amount of time is the sleep cycle interval time less the amount of time that has elapsed since the electronic device last completed operating in the low-power mode.

According to one embodiment, an electronic device includes a processor, at least one process component for performing a function of the electronic device, and a power management component operatively coupled to the at least one process component. The process component is to be executed by the processor. The power management component is configured to determine whether one or more operating conditions for allowing the electronic device to operate in a low-power mode are satisfied, and further configured to prevent the electronic device from operating in the low-power mode if fewer than all of the operating conditions are satisfied, and further configured to cause the electronic device to operate in the low-power mode if all of the operating conditions are satisfied by signaling the processor to enter the low-power mode.

In another embodiment, the electronic device may be configured to suspend execution of the function of the process component if at least one of the operating conditions is satisfied. The electronic device may be further configured to resume execution of the function of the process component subsequent to causing, by the power management component, the electronic device to operate in the low-power mode. The electronic device may be further configured to resume execution of the function of the process component subsequent to preventing, by the power management component, the electronic device from operating in the low-power mode.

According to another embodiment, the electronic device may further include at least one peripheral device operatively coupled to the process component and/or the power management component, either of which may be further configured to remove power from the peripheral device if at least one of the operating conditions is satisfied, restore power to the peripheral device subsequent to causing, by the power management component, the electronic device to operate in the low-power, and restore power to the peripheral device subsequent to preventing, by the power management component, the electronic device from operating in the low-power mode.

According to another embodiment, the processor may include a microprocessor configured to operate in the low-power mode. In another embodiment, the device may include a set of backup registers operatively coupled to the processor for preserving data while the electronic device is operating in the low-power mode.

According to another embodiment, the power management component may be further configured to cause the electronic device to operate in the low power mode for a predetermined amount of time. If a sleep cycle interval time is greater than or equal to an amount of time that has elapsed since the electronic device last completed operating in the low-power mode, the predetermined amount of time is the sleep cycle interval time less the amount of time that has elapsed since the electronic device last completed operating in the low-power mode.

According to one embodiment, an electronic device includes a processor and means for operating the processor in a low-power mode based on one or more operating conditions of the device that will prevent the processor from operating in the low-power mode if fewer than all of the one or more operating conditions are satisfied and will cause the processor to operate in the low-power mode if all of the one or more operating conditions are satisfied. The device may further include means for suspending execution, by the processor, of at least one process of the electronic device if at least one of the one or more operating conditions is satisfied, and resuming execution of the process subsequent to causing the electronic device to operate in the low-power mode.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE INVENTION

Figure 1:
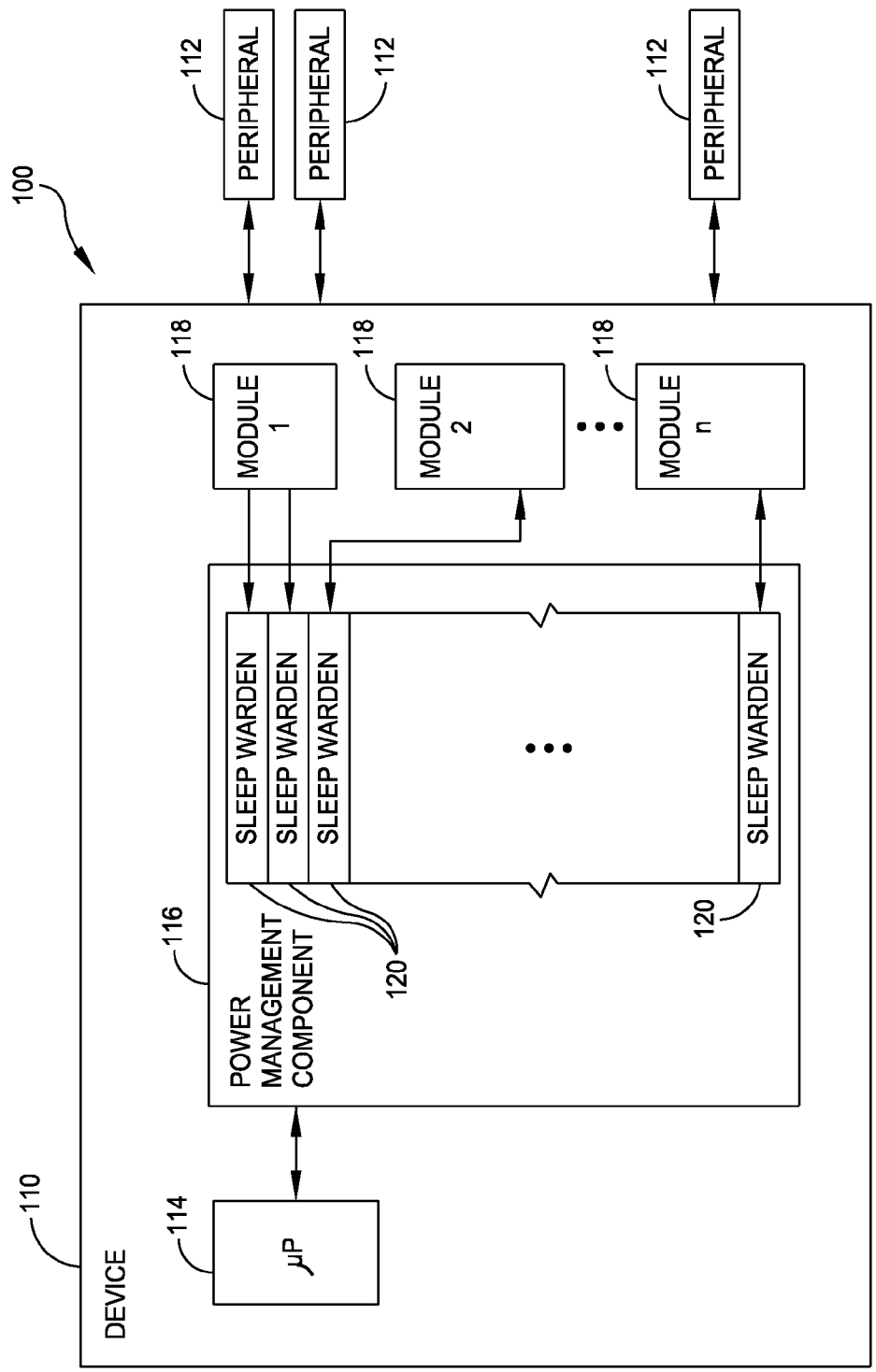
FIG. 1 is a functional block diagram of a system in accordance with one embodiment of the present invention.

Embodiments of this invention are not limited in their application to the details of construction and the arrangement of components set forth in the following description or illustrated in the drawings. Embodiments of the invention are capable of other embodiments and of being practiced or carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Embodiments of the present invention relate to power management in electronic devices, and in particular, electronic devices having a processor, such as a microprocessor. Particularly in devices that rely on an independent source of power, such as a battery, it is desirable to limit power consumption to extend battery life. To reduce power consumption, many devices support one or more low-power modes, which may be activated, for example, by software, firmware, hardware, or any combination thereof. In one exemplary low-power mode, the processor consumes less power by halting execution of instructions. As discussed above, many devices that make use of these low-power modes operate on the basis of a "sleep cycle" in which the device regularly enters the low-power mode for some amount of time, and then "wakes" from the low-power mode to perform certain functions. If the timing and duration of the sleep cycle is not compatible with the processing demands of the device, which may vary over time, it becomes difficult to manage the low-power modes using a regularly scheduled sleep cycle. For example, the processor is ideally available at all times to perform important or critical functions (e.g., on demand), but it is also desirable to enter a low-power mode as soon as possible (e.g., as soon as all important or critical functions have completed) to avoid wasting power during periods of relatively low processing demand. Regular, unsolicited entry into low-power mode may cause undesirable processing delays and interruptions (e.g., certain processes may be denied access to real-time data, or may have to be restarted), particularly in systems having multiple, concurrently executing processes. This may further lead to inefficient power consumption by the device.

One known approach to low-power management is to cause the device to cycle into and out of a low-power mode on a regular schedule (e.g., spend 15 seconds in low-power mode, followed by 15 seconds out of low-power mode, in a repeating manner). According to one embodiment, it is appreciated that if all functions (e.g., processes or tasks) of the device require less processing time than is provided in each sleep cycle, the device will consume a greater amount of power than it would if the device could enter low-power mode earlier than scheduled. Further, if any of these functions cause peripherals or other hardware to be powered on when they are not needed, energy is further wasted when, conceivably, the peripherals could be temporarily powered off. Conversely, if one or more functions require more processing time than is provided in each sleep cycle, those functions will be interrupted when the device enters low-power mode. Such interruptions may cause delays (e.g., due to restarting the functions after waking from the low-power mode), lost data (e.g., real-time data that is lost during low-power mode), or other undesirable effects.

FIG. 1 is a functional block diagram of a system 100 according to one embodiment of the present disclosure. The system 100 includes an electronic device 110 that is configured to operate in a low-power mode and, optionally, one or more peripherals 112 operatively connected to the device. The device 110 includes a microprocessor 114, a power management module 116, and one or more process modules 118 (also referred to herein as "modules"). The power management module 116 communicates with the microprocessor 114 and each of the process modules 118. The power management module 116 may include software or firmware that is executed by the microprocessor 114, or by another processor. The power management module 116 includes one or more sleep wardens 120, each of which is associated with one or more operating conditions of the device 110 and may be registered, manipulated and/or monitored by a respective process module 118. Each sleep warden 120 is an extensible mechanism, instantiated by one of the modules 118, which the power management module 116 uses to operate the low-power mode of the device 110.

The device 110 of FIG. 1 uses less power when operating in low-power mode than it does when operating in another mode (e.g., normal operating mode), in part because no instructions are executed by the microprocessor 114 while the device is in low-power mode. Accordingly, power consumption and battery life advantages are presently realized by optimizing the use of the low-power mode. The device 110 supports at least one of a plurality of low-power mode states: STANDBY, STOP, and SLEEP, although it will be appreciated that other states may be implemented according to various applications of the system 100.

In STANDBY, the microprocessor 114 is substantially shut down, except for a limited number of "backup" functions. Waking from STANDBY results in a full reset of the microprocessor 114 and loss of all data stored in random access memory (RAM). Waking from STANDBY also includes resetting each module 118 or process that was executing on the microprocessor 114 prior to entering low-power mode. Among the three states in which the device 110 may be operated in low-power mode, STANDBY uses the least amount of power, yet has the longest "wakeup" latency, which is the amount of time required to resume normal processing subsequent to leaving the low-power mode. In STOP, data stored in RAM is saved, enabling each module 118 to resume processing from a point where it left off when the device 110 entered low-power mode. STOP uses more power, and has shorter wakeup latency, than STANDBY. In SLEEP, only the internal clock of the microprocessor 114 is stopped (in essence, halting all processes that are presently executing); all data in the memory (not shown) of the device 110 is preserved. When waking from SLEEP, the internal clock is restarted, enabling execution of all processes to resume almost immediately. SLEEP uses more power than STOP but has shorter wakeup latency.

In addition to the above described low-power mode, the device 110 can operate in an "always-on" mode, which inhibits the device from operating in low-power mode. The always-on mode may be used when it is not desirable to operate in low-power mode, for example, when a user of the device is willing to trade off increased power consumption for increased performance of the device 110. The device 110 may freely alternate between always-on mode and a sleep cycle associated with low-power mode.

Low-power mode is activated or requested by the power management module 116, for example, through an input to the microprocessor 114. The power management module 116 is responsible at least for activating low-power mode based on a status of each of the sleep wardens 120. The status indicates whether the process module 118 that registered the respective sleep warden 120 is ready for the device 110 to enter low-power mode. In one embodiment, the status is implemented as a Boolean flag.

According to another embodiment, the microprocessor 114 includes a plurality of backup registers (not shown) for storing data in conjunction with one or more of the low-power modes. In one example, there are 42 16-bit backup registers. Each register may be used by one of the modules 118 to store data prior to entering one of the low-power modes. The data stored in the backup registers is preserved during low-power mode, and available for use subsequent to waking from low-power mode.

Figure 2:
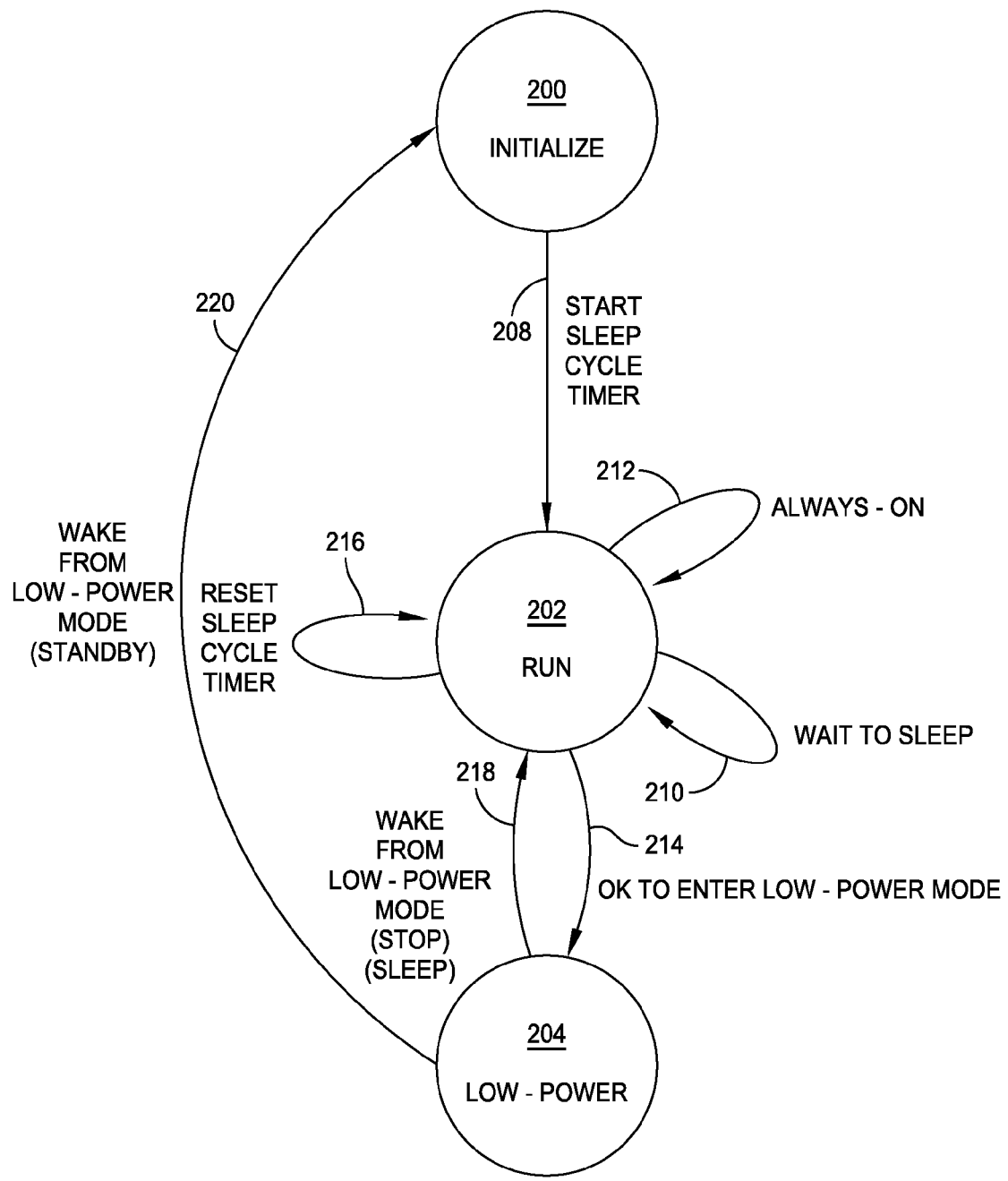
FIG. 2 illustrates a state diagram of a process for operating the system of FIG. 1 in accordance with one embodiment.

FIG. 2 illustrates a state diagram of one embodiment of a process for operating the system 100, described above with reference to FIG. 1. The process includes an initialize state 200, a run state 202, and a low-power state 204. The device 110 operates in low-power mode when the process is in the low-power state 204, and operates in normal mode (e.g., where normal operation of the device occurs) when the process is in the run state 202. The process begins in the initialize state 200, where one or more of the modules 118 may each register one or more sleep wardens 120 with the power management component 116. Other initialization functions may also occur in the initialize state 200, as will be understood by one of skill in the art. As described above, the sleep wardens 120 are used to control or restrain when the device 110 enters into low-power mode, in particular, to ensure that the device 110 cannot enter low-power mode before all operating conditions for entering low-power mode are satisfied. The operating conditions are determined by the modules 118. For example, each module 118 may include one or more operating conditions that must be satisfied before the module is ready for the device 110 to enter low-power mode. Accordingly, each module 118 registers one or more sleep wardens 120 if the module needs to prevent the device 110 from entering low-power mode before the respective operating conditions have been satisfied. The sleep wardens 120 should be registered in the initialize state 200 to ensure that the device 110 does not enter low-power mode before all of the modules 118 have registered their respective sleep wardens.

According to one embodiment, each of the sleep wardens 120 includes a Boolean flag. Upon registration, the sleep warden 120 flag is set, or initialized, to a first value (e.g., FALSE). As long as any sleep warden 120 flag is set to the first value, the device 110 will be prevented from entering low-power mode, as illustrated by reference to Table 1.

TABLE 1

| Registered Sleep Wardens | | | OK TO ENTER |
|---|---|---|---|
| Flag 1 | Flag 2 | Flag 3 | LOW-POWER MODE |
| FALSE | FALSE | FALSE | NO |
| FALSE | FALSE | TRUE | NO |
| FALSE | TRUE | FALSE | NO |
| FALSE | TRUE | TRUE | NO |
| TRUE | FALSE | FALSE | NO |
| TRUE | FALSE | TRUE | NO |
| TRUE | TRUE | FALSE | NO |
| TRUE | TRUE | TRUE | YES |

In this example, Table 1 shows various values of the flags for each of three sleep wardens, and a corresponding "ok to enter low-power mode" determination. It will be understood that the number of sleep wardens 120 and the values of the flags may be modified according to various applications of the present disclosure. As will be described in further detail below, each module 118 sets the value of a respective flag to a second value (e.g., TRUE) when one or more operating conditions for allowing the device 110 to operate in low-power mode are satisfied. According to one embodiment, if, and only if, all sleep wardens 120 are set to the second value will the device 110 operate in low-power mode. It will be appreciated that the flags may be used in various ways to indicate that the operating conditions for operating in low-power mode are satisfied. For example, the flags may represent a priority associated with each sleep warden 120 (e.g., the flags are represented by numeric values rather than Boolean values).

After all initialization functions have completed, the process transitions to the run state 202, as indicated at 208, where normal operations of the device 110 occur. Upon transitioning to the run state 202, a sleep cycle timer is started. The sleep cycle timer is used to measure a sleep cycle interval, which is a time interval during which the device 110 operates in the run state 202 and, if permitted, in the low-power state 204. For example, the sleep cycle interval may be 15 seconds long. In this example, the device 110 operates in the run state 202 at least once every 15 seconds. As will be described in further detail below with reference to the low-power state 204, the device 110 "wakes" from low-power mode at least once every sleep cycle (e.g., at least once every 15 seconds) to allow the modules 118 to run with at least that frequency. In other words, no module 118 will be prevented from running for more than one sleep cycle by virtue of the device 110 operating in low-power mode. It will be understood that the sleep cycle interval may be any amount of time that is appropriate for a given application of the device 110.

In the run state 202, each module 118 signals the respective sleep warden(s) 120 when the module determines that the operating conditions for allowing the device 110 to operate in low-power mode are satisfied. As described above, the module 118 may signal the sleep warden 120 by setting the sleep warden flag to the second value (e.g., TRUE). Further, as will be described in further detail below, each module 118 may optionally suspend execution of its respective functions pending completion of the sleep cycle or entry into low-power mode. This frees resources within the device 110 and prepares the module 118 for entering low-power mode.

The power management module 116 checks on a substantially regular basis to see if all sleep wardens 120 contain the second value, which indicates that all operating conditions for allowing the device 110 to enter low-power mode have been satisfied. If fewer than all sleep wardens 120 contain the second value (i.e., fewer than all of the operating conditions are satisfied), a "wait to sleep" transition back to the run state 202 occurs, as indicated at 210. However, if all sleep wardens 120 contain the second value (i.e., all of the operating conditions are satisfied), an "OK to sleep" transition occurs to the low-power state 204, as indicated at 214. In an alternative embodiment, each module 118 may cause the power management module 116 to check the sleep wardens 120 after signaling the sleep warden. This helps to ensure that low-power mode is entered as soon as possible.

As noted above, the sleep cycle timer is running while the process is in the run state 202. If the sleep cycle timer expires before all sleep wardens 120 contain the second value, a "reset sleep timer" transition back to the run state 202 occurs, as indicated at 216. In essence, this occurs when fewer than all of the operating conditions are satisfied before the sleep cycle interval elapses. All of the sleep warden 120 flags are set to the first value (e.g., FALSE) at each reset sleep timer transition 216 to signal all of the modules 118 to resume execution of their respective processes. This ensures that no module 118 remains suspended for more than one full sleep cycle interval. This also ensures that each module 118 reasserts its sleep warden signal at least once during each sleep cycle.

Alternatively, the device 110 may operate in always on mode, wherein an "always on" transition back to the run state 202 occurs, as indicated at 212. If the device is operating in always on mode, all of the sleep warden 120 flags are set to the first value (e.g., FALSE) at each always on transition 212. This allows each module 118 to resume execution of its respective processes when low-power mode is not utilized.

According to one embodiment, the microprocessor 114 of the device 110 includes a real time clock (RTC) which is set by the power management module 116 to run for a predetermined amount of time upon entering the low-power state 204. The predetermined amount of time is the amount of time that the device 110 will operate in low-power mode. Upon expiration of the RTC (i.e., after the device 110 has been operating in low-power mode for the predetermined amount of time), the device 110 will wake from low-power mode and return to normal operating mode. The predetermined amount of time is determined based on the elapsed time of the sleep cycle timer when the OK to sleep transition 214 occurs.

In one example, if the sleep cycle interval time is greater than or equal to an amount of time that has elapsed since the device 110 last completed operating in low-power mode, the predetermined amount of time is the sleep cycle interval time less the amount of time that has elapsed since the device last completed operating in low-power mode. For example, if the sleep cycle interval time is 15 seconds, and the OK to sleep transition 214 occurs 5 seconds after the sleep cycle timer was started (e.g., either upon the start sleep cycle transition 208 or the reset sleep cycle transition 216), then the predetermined amount of time will be 10 seconds. In this example, the device 110 will remain in low-power mode for ten seconds, after which the process will transition back to either the initialize state 200 or the run state 202, depending on the state of the low-power mode of the device 110. For example, when the device 110 wakes from either STOP or SLEEP, the process will transition to the run state 202, as indicated at 218. If the device 110 wakes from STANDBY, the process will transition to the initialize state 200, as indicated at 220.

Figure 3A:
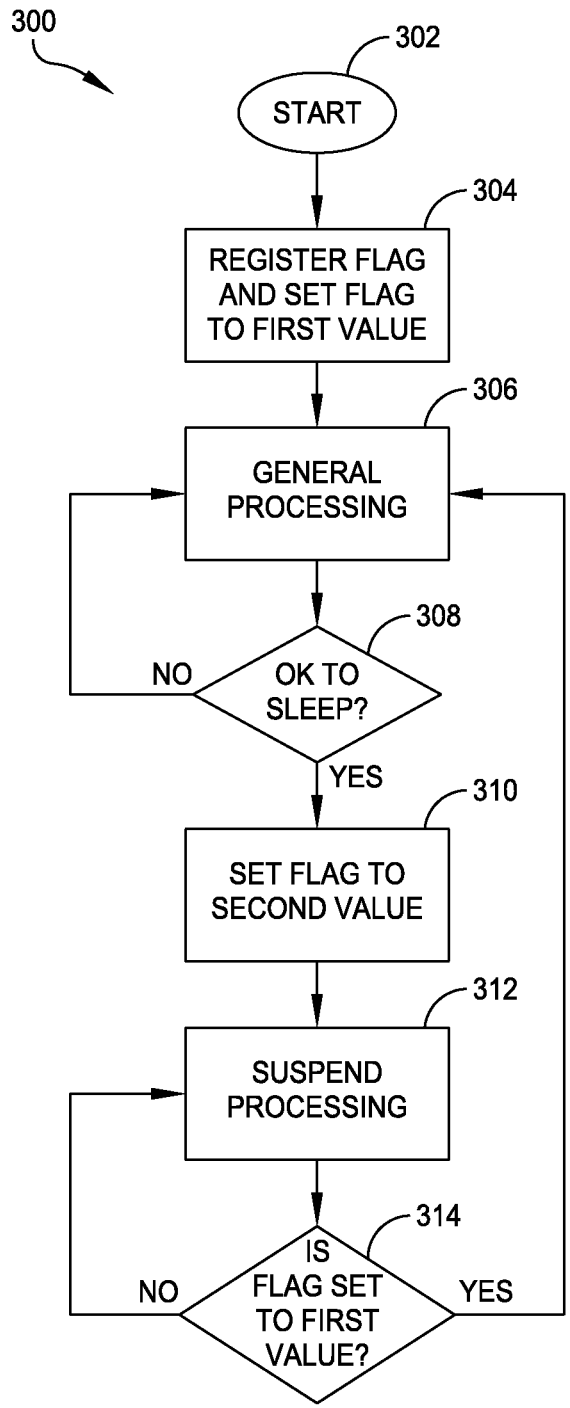
FIG. 3A is a flow diagram illustrating a process performed by a device of the system of FIG. 1 in accordance with another embodiment of the present invention.
Figure 3B:
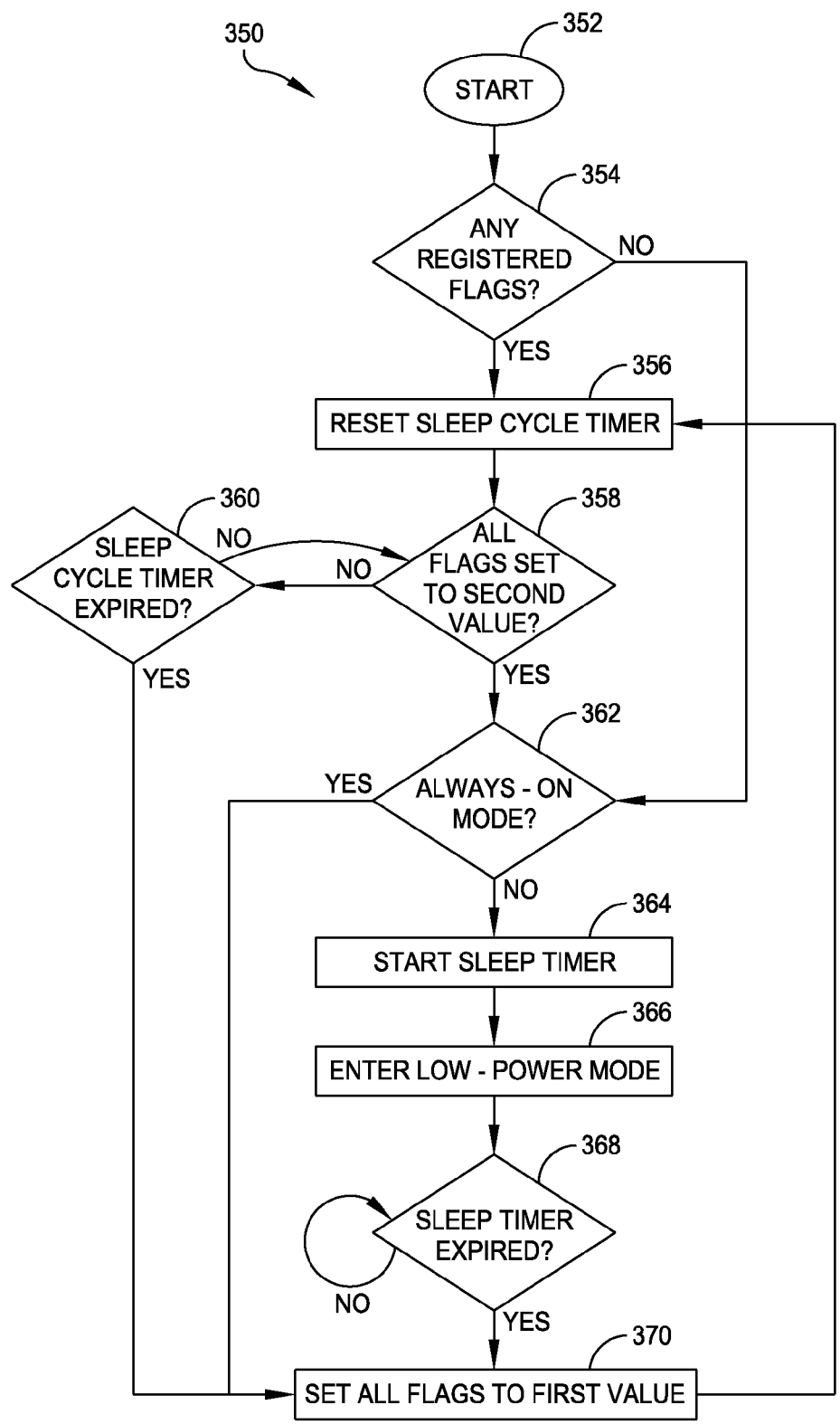
FIG. 3B is a flow diagram illustrating a process performed by the device of the system of FIG. 1 in accordance with yet another embodiment of the present invention.

FIGS. 3A and 3B show flow diagrams illustrating several aspects of the present disclosure. As described above, the device 110 of FIG. 1 is operated in a low-power mode based on one or more operating conditions for allowing the device 110 to operate in the low-power mode. According to one embodiment, the sleep wardens 120 are extensible mechanisms used to control when the device 110 may be operated in low-power mode. Each of the sleep wardens 120 are registered, set, and monitored by one of the modules 118, and substantially concurrently, each of the sleep wardens 120 are monitored and set by the power management component 116. FIG. 3A shows a flow diagram of a process 300 that is performed by one of the modules 118, and FIG. 3B shows a flow diagram of another process 350 that is performed by the power management component 116. It will be understood that process 300 may be performed by each module 118 of the device 110, and further that process 350 may be performed concurrently or substantially concurrently to process 300. Thus, each instance of process 300 works in conjunction with process 350 for controlling when the device 110 may be operated in low-power mode (i.e., process 300 and process 350 are companion processes).

FIG. 3A shows a flow diagram illustrating the process 300 performed by a module 118 of the device 110 of FIG. 1, according to one embodiment. At block 302, the process 300 begins. At block 304, the module 118 registers one or more sleep wardens 120, with the power management component 116. Each sleep warden 120 includes a flag. The flag of each sleep warden 120 represents the state of one or more operating conditions that should be satisfied before allowing the device 110 to operate in low-power mode.

At block 306, general processing by the module 118 occurs. The general processing may include any processing for performing one or more functions of the device 110. Further, the general processing includes determining whether some or any of the operating conditions are satisfied. For example, if the general processing includes processing that should not be interrupted as a result of entering low-power mode (e.g., real-time or critical processing), then the module 118 uses a sleep warden 120 to prevent the device 110 from operating in low-power mode at least until the processing has completed.

At block 308, the operating conditions for allowing the device 110 to operate in low-power mode are evaluated to determine if they are satisfied. If not, then process 300 returns to general processing at block 306. If the operating conditions are satisfied, then process 300 continues to block 310. At block 310, the flag of the respective sleep warden 120 is set to a second value, such as described above with respect to FIG. 2. For example, the flag, which is initially set to FALSE, may be set to TRUE. This indicates to the power management component 116 that, with respect to the corresponding sleep warden 120, the module 118 is ready for the device 110 to enter low-power mode. Once each sleep warden 120 has been set to the second value (e.g., the flag has been set to TRUE), the module 118 should not attempt to change the value of the sleep warden again at least until the current sleep cycle has completed.

At block 312, the module 118 may optionally suspend processing that is being performed by or for the module. By suspending processing, the module 118, for example, frees up resources on the device (e.g., processing time on the microprocessor 114). The module 118 may also remove power from one or more peripherals 112 of the system 100 in FIG. 1 to further reduce the power consumption of the device 110 while processing is suspended.

Processing remains suspended until the device 110 wakes from low-power mode. At that time, the power management module 116 will set the flag of each sleep warden to a first value, such as described above with respect to FIG. 2. For example, the flag, which is set to TRUE by one of the modules 118 prior to entering low-power mode, may be set to FALSE subsequent to operating in low-power mode. This indicates to the module 118 that the module may resume processing. Accordingly, at block 314 of process 300, the module 118 checks if the flag contains the first value (e.g., if the flag has been set to FALSE). If not, then process 300 returns to block 312. If the flag contains the first value, then processing is resumed, and process 300 returns to block 306.

FIG. 3B shows a flow diagram illustrating the process 350 performed by a power management component 116 of the device 110 of FIG. 1, according to one embodiment. At block 352, the process 350 begins. At block 354, process 350 checks if any sleep wardens 120 are registered by the modules 118. If there are no registered sleep wardens 120, then process 350 proceeds to block 362, which will be described below. If there is at least one sleep warden 120, process 350 proceeds to block 356.

At block 356, a sleep cycle timer is reset. As described above with reference to FIG. 2, the sleep cycle timer is used to measure a sleep cycle interval, which is a time interval during which the device 110 operates in the run state 202, the low-power state 204, or both.

At block 358, the power management component 116 checks the flags of all of the sleep wardens 120. If fewer than all of the flags contain the second value (e.g., some of the flags are set to FALSE), process 350 proceeds to block 360; otherwise, process 350 proceeds to block 362.

At block 360, the power management component 116 checks the sleep cycle timer. If the sleep cycle timer has not expired, process 350 returns to block 358, where the sleep wardens 120 are again checked. If the sleep cycle timer has expired, the process 350 proceeds to block 370, which will be described below. If the sleep cycle timer expires before all of the sleep warden 120 flags are cleared, then the device 110 will not operate in low-power mode during the current sleep cycle, and a new sleep cycle will begin.

At block 362, the power management component 116 checks if the device 110 is operating in always-on mode. If it is, then the device 110 will not be permitted to operate in low-power mode, and process 350 proceeds to block 370; otherwise, process 350 proceeds to block 364.

At block 364, a low-power mode (or sleep) timer is started. The sleep timer may be included in, for example, the RTC of the microprocessor 114, such as described above with reference to FIG. 2, although any timer may be utilized. At block 366, the device 110 begins operating in low-power mode. The device 110 continues to operate in low-power mode at least until the sleep timer expires. At block 368, the sleep timer is checked. If the sleep timer has not yet expired, process 350 remains at block 368, where the sleep timer is checked again. If the sleep timer has expired, process 350 proceeds to block 370.

At block 370, the power management module 116 sets the flags of all of the registered sleep wardens 120 to the first value (e.g., sets the flags to FALSE). As described above with reference to block 314 of FIG. 3A, each module 118 uses the sleep wardens 120 as an indication to resume processing (or "wake up") subsequent to low-power mode operation. If the device 110 is operating in always-on mode, the device never operates in low-power mode, but rather immediately wakes each of the modules 118 by resetting the flags. Further, if the sleep cycle timer has expired, that is an indication that fewer than all of the modules 118 have indicated a readiness for the device to operate in low-power mode. Accordingly, the device 110 will not operate in low-power mode during the current sleep cycle, and all modules 118 may resume processing.

Process 350 then returns to block 356 to begin a new sleep cycle.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. For example, according to one aspect, the present invention may be implemented in any device that is configured to operate in a low-power consumption mode. The present invention enables distributed and modular control over the low-power mode of the device such that the device may operate in low-power mode as soon as all individual components (e.g., software modules) have signaled a readiness for the device to enter low-power mode, which potentially reduces power consumption. This technique also enables the individual components to prevent the device from operating in low-power mode when the respective component requires resources (e.g., processing time) to perform a function that would otherwise be interrupted by operating in low-power mode, which is undesirable. In another aspect, the present invention allows the individual modules to suspend processing pending operation in low-power mode, and further allows the modules to reduce or remove power from peripherals when such power is not needed (e.g., while processing is suspended). Accordingly, the foregoing description and drawings are by way of example only.

What is claimed is:

1. A method of operating an electronic device, the method comprising:
   determining whether one or more operating conditions for allowing the electronic device to operate in a low-power mode are satisfied;
   preventing the electronic device from operating in the low-power mode if fewer than all of the one or more operating conditions are satisfied;
   causing the electronic device to operate in the low-power mode if all of the one or more operating conditions are satisfied;
   removing power from at least one peripheral device that is coupled to the electronic device if at least one of the one or more operating conditions is satisfied;
   restoring power to the at least one peripheral device subsequent to causing the electronic device to operate in the low-power mode; and
   restoring power to the at least one peripheral device subsequent to preventing the electronic device from operating in the low-power mode.

2. The method of claim 1, further comprising suspending execution of at least one process of the electronic device if at least one of the one or more operating conditions is satisfied.

3. The method of claim 2, further comprising resuming execution of the at least one process subsequent to causing the electronic device to operate in the low-power mode.

4. The method of claim 2, wherein the method further comprises resuming execution of the at least one process subsequent to preventing the electronic device from operating in the low-power mode.

5. The method of claim 1, further comprising:
- initializing one or more flags to a first value, each of the one or more flags being associated with one of the one or more operating conditions;
- for each of the one or more operating conditions, detecting that the operating condition is satisfied; and
- setting one of the one or more flags to a second value that is different than the first value subsequent to detecting that a respective one of the one or more operating conditions is satisfied;
- wherein preventing the electronic device from operating in the low-power mode further includes preventing the electronic device from operating in the low-power mode if any of the one or more flags contains the first value.

6. The method of claim 5, further comprising setting all of the one or more flags to the first value subsequent to causing the electronic device to operate in the low-power mode.

7. The method of claim 5, wherein the method further comprises setting all of the one or more flags to the first value subsequent to preventing the electronic device from operating in the low-power mode.

8. An electronic device, comprising:
- a processor;
- at least one process component for performing a function of the electronic device, the at least one process component to be executed by the processor;
- at least one peripheral device operatively coupled to at least one of the at least one process component; and
- a power management component operatively coupled to the at least one process component and the at least one peripheral device, the power management component configured to:
- determine whether one or more operating conditions for allowing the electronic device to operate in a low-power mode are satisfied;
- prevent the electronic device from operating in the low-power mode if fewer than all of the one or more operating conditions are satisfied;
- cause the electronic device to operate in the low-power mode if all of the one or more operating conditions are satisfied by signaling the processor to enter the low-power mode;
- remove power from the at least one peripheral device if at least one of the one or more operating conditions is satisfied;
- restore power to the at least one peripheral device subsequent to causing, by the power management component, the electronic device to operate in the low-power; and
- restore power to the at least one peripheral device subsequent to preventing, by the power management component, the electronic device from operating in the low-power mode.

9. The electronic device of claim 8, wherein the electronic device is configured to suspend execution of the function of the at least one process component if at least one of the one or more operating conditions is satisfied.

10. The electronic device of claim 9, wherein the electronic device is further configured to resume execution of the function of the at least one process component subsequent to causing, by the power management component, the electronic device to operate in the low-power mode.

11. The electronic device of claim 9, wherein the electronic device is further configured to resume execution of the function of the at least one process component subsequent to preventing, by the power management component, the electronic device from operating in the low-power mode.

12. The electronic device of claim 8, wherein the processor includes a microprocessor configured to operate in the low-power mode.

13. The electronic device of claim 8, further comprising a set of backup registers operatively coupled to the processor for preserving data while the electronic device is operating in the low-power mode.

* * * * *